United States Patent
Bang et al.

(10) Patent No.: US 11,094,199 B2
(45) Date of Patent: Aug. 17, 2021

(54) APPARATUS FOR DISPLAYING STEERING INFORMATION OF PRECEDING VEHICLE AND METHOD THEREOF

(71) Applicants: HYUNDAI MOTOR COMPANY, Seoul (KR); KIA MOTORS CORPORATION, Seoul (KR)

(72) Inventors: Kyung Joo Bang, Seoul (KR); Hong Gi Park, Seoul (KR); Sang Yeob Lee, Seongnam-si (KR); Il Hwan Kim, Hwaseong-si (KR); Seung Hyun Kim, Seoul (KR); Dong Hyuk Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/995,501

(22) Filed: Aug. 17, 2020

(65) Prior Publication Data
US 2021/0150906 A1 May 20, 2021

(30) Foreign Application Priority Data
Nov. 20, 2019 (KR) .................. 10-2019-0149938

(51) Int. Cl.
- *G08G 1/00* (2006.01)
- *G08G 1/16* (2006.01)
- *B60K 35/00* (2006.01)
- *B60Q 9/00* (2006.01)
- *G08B 21/18* (2006.01)

(52) U.S. Cl.
CPC ............. *G08G 1/167* (2013.01); *B60K 35/00* (2013.01); *B60Q 9/008* (2013.01); *G08B 21/182* (2013.01); *G08G 1/22* (2013.01); *B60K 2370/152* (2019.05); *B60K 2370/167* (2019.05); *B60K 2370/171* (2019.05); *B60K 2370/178* (2019.05)

(58) Field of Classification Search
CPC .......... G08G 1/167; G08G 1/22; B60K 35/00; B60K 2370/167; B60K 2370/152; B60K 2370/178; B60K 2370/171; B60Q 9/008; G08B 21/182
USPC ........................................................ 340/901
See application file for complete search history.

(56) References Cited

U.S. PATENT DOCUMENTS

| | | | | |
|---|---|---|---|---|
| 7,433,772 B2 * | 10/2008 | Isaji | .................... | B60W 40/072 701/71 |
| 9,020,680 B2 * | 4/2015 | Solyom | .................... | G08G 1/22 701/23 |
| 10,005,493 B2 * | 6/2018 | Sakamoto | ........... | B60W 30/165 |
| 10,372,123 B2 * | 8/2019 | Cremona | ................. | G08G 1/22 |

(Continued)

FOREIGN PATENT DOCUMENTS

JP  2012-076639 A  4/2012

OTHER PUBLICATIONS

European Search Report dated Jan. 22, 2021 from the corresponding European Application No. 20188561.3, 9 pp.

*Primary Examiner* — Zhen Y Wu

(57) ABSTRACT

An apparatus for displaying steering information of a preceding vehicle may include: a processor of a host vehicle, where the processor receives steering information of the preceding vehicle among a plurality of platooning vehicles including the host vehicle; and a display controlled by the processor to display the steering information of the preceding vehicle.

27 Claims, 17 Drawing Sheets

(56) References Cited

U.S. PATENT DOCUMENTS

| | | | |
|---|---|---|---|
| 10,449,960 B2* | 10/2019 | Keller | G08G 1/166 |
| 10,593,211 B2* | 3/2020 | Kim | G05D 1/0295 |
| 10,737,695 B2* | 8/2020 | Liu | B60W 30/16 |
| 10,818,189 B2* | 10/2020 | Dudar | G08G 1/22 |
| 2017/0036601 A1* | 2/2017 | Kimura | B60R 1/00 |
| 2017/0344023 A1* | 11/2017 | Laubinger | B60W 50/14 |
| 2017/0361762 A1* | 12/2017 | Wunsche, III | B60T 7/22 |
| 2017/0369062 A1* | 12/2017 | Saigusa | B60W 30/16 |
| 2017/0369067 A1* | 12/2017 | Saigusa | B60W 30/18163 |
| 2018/0032086 A1* | 2/2018 | Punithan | G05D 1/0295 |
| 2018/0218713 A1* | 8/2018 | Kusanagi | G02B 27/01 |
| 2019/0179334 A1* | 6/2019 | Kim | G08G 1/22 |
| 2019/0179339 A1* | 6/2019 | Kim | G08G 1/162 |
| 2019/0286163 A1* | 9/2019 | Yasuda | G05D 1/0293 |
| 2020/0108869 A1* | 4/2020 | You | H04W 4/46 |
| 2020/0122741 A1* | 4/2020 | Kuehnle | B60W 50/085 |
| 2020/0135033 A1* | 4/2020 | Switkes | G08G 1/22 |
| 2020/0139774 A1* | 5/2020 | Kim | G06F 17/11 |
| 2020/0349850 A1* | 11/2020 | Park | G08G 1/22 |
| 2020/0391593 A1* | 12/2020 | Lee | G09G 5/024 |

* cited by examiner

MAINTAIN PRESENT STEERING
BECAUSE OF SMOOTHLY
FOLLOWING PRECEDING VEHICLE

STEERING CONTROL TO LEFT IS
NECESSARY TO MATCH PRESENT
RELATIVE LATERAL SPEED TO
TARGET RELATIVE LATERAL SPEED

FURTHER STEERING TO LEFT IS NECESSARY TO MATCH PRESENT RELATIVE LATERAL SPEED TO TARGET RELATIVE LATERAL SPEED

MAINTAIN PRESENT STEERING BECAUSE OF SMOOTHLY FOLLOWING PRECEDING VEHICLE

STEERING TO RIGHT IS NECESSARY
TO MATCH PRESENT RELATIVE
LATERAL SPEED TO TARGET
RELATIVE LATERAL SPEED

APPARATUS FOR DISPLAYING STEERING INFORMATION OF PRECEDING VEHICLE AND METHOD THEREOF

CROSS-REFERENCE TO RELATED APPLICATION

This application claims priority to and the benefit of Korean Patent Application No. 10-2019-0149938, filed on Nov. 20, 2019, the entire contents of which are incorporated herein by reference.

FIELD

The present disclosure relates to an apparatus for displaying steering information and a method thereof, and more particularly to a technology of displaying steering status of a platooning vehicle.

BACKGROUND

The statements in this section merely provide background information related to the present disclosure and may not constitute prior art.

Platooning is a technology that enables a plurality of vehicles to autonomously drive while the vehicles are aligned with each other and spaced apart from each other by a specified distance. During platooning, a leading platoon vehicle, which is positioned at the front most of a platoon, may control at least one following platoon vehicle which follows the leading platoon vehicle. The leading platoon vehicle may control a plurality of platoon vehicles to maintain a predetermined distance between the plurality of platoon vehicles included in the platoon and may exchange the behavior information of the plurality of platoon vehicles and also driving situation information thereof through inter-vehicle communication.

A longitudinal distance between the platoon vehicles included in the platooning group may be controlled to maintain a specific distance during platoon driving based on information from a vehicle sensor and a steering device. However, we have discovered that a driver of the platoon vehicle controls the steering of the vehicle for safety reason.

We have also found that when the inter-vehicle distance (i.e., a distance between a leading platoon vehicle and a following platoon vehicle) is short and the height of the leading platoon vehicle (e.g., a truck) is high enough to interrupt the visual field of a driver of the following platoon vehicle, the driver of the following platoon vehicle has to perform steering control of the vehicle while seeing only the back of the leading platoon vehicle, without having a clear front view of the driving road. Accordingly, the driver of the following platoon vehicle has a heavy burden in performing the steering control.

SUMMARY

The present disclosure has been made to solve the above-mentioned problems occurring in the prior art while advantages achieved by the prior art are maintained intact.

An aspect of the present disclosure provides a steering information displaying apparatus, capable of controlling platooning to be safe by resolving a problem that among a plurality of platooning vehicles, a preceding vehicle obstructs a visual field of a driver of a following vehicle, by exchanging steering information of the preceding vehicle and displaying the steering information to the driver of the following vehicle in platooning, and a method thereof.

Another aspect of the present disclosure provides a steering information displaying apparatus, capable of displaying, to a driver of a following vehicle (e.g., a host vehicle), a target relative lateral speed and a present relative lateral speed calculated based on a present relative lateral distance to a preceding vehicle, and a method thereof.

Another aspect of the present disclosure provides a steering information displaying apparatus, capable of coordinating information on a lane, which is covered by a preceding vehicle, based on lane information measured by the preceding vehicle, and displaying the coordinated information of the lane to a driver of a following vehicle, and a method thereof.

Still another aspect of the present disclosure provides a steering information displaying apparatus, capable of obtaining lane information from a precise map and displaying the lane information to a driver of a following vehicle, and a method thereof.

Still yet another aspect of the present disclosure provides a steering information displaying apparatus, capable of displaying, to a driver of a following vehicle, information on a steering angle and a lane departure warning of a preceding vehicle, which is received from the preceding vehicle, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for displaying steering information of a vehicle may include: a processor of a host vehicle that receives the steering information of a preceding vehicle among a plurality of platooning vehicles including the host vehicle; and a display controlled by the processor to display the steering information of the preceding vehicle.

According to some forms of the present disclosure, the processor may calculate a target relative lateral speed of the host vehicle with respect to the preceding vehicle using a present relative lateral distance to the preceding vehicle from the host vehicle, display, on the display, the target relative lateral speed and a present relative lateral speed of the host vehicle relative to the preceding vehicle, determine a dangerous situation resulting from steering control, and display the determined dangerous situation on the display.

According to some forms, the processor may determine a degree of the determined dangerous situation based on at least one of the target relative lateral speed, a yaw rate of a host vehicle, the present relative lateral speed, the present relative lateral distance, or a lane departure time of the host vehicle.

According to some forms, the processor may display, on the display, a bar graph with a reference point that defines a right side representing a plus direction at the right of the reference point on the bar graph and a left side representing a minus direction at the left of the reference point on the bar graph, and the processor may display the target relative lateral speed and the present relative lateral speed on the bar graph.

According to some forms, the processor may mark, on the bar graph, the target relative lateral speed with a triangular mark and a solid line, and the present relative lateral speed with a bar (e.g., a vertical solid line).

According to some forms, the processor may display, on the display, a target relative lateral speed region, which is defined as a specific range of the target relative lateral speed, marked on the bar graph.

According to some forms, the processor may determine a size of the target relative lateral speed region based on a difference between the target relative lateral speed and the present relative lateral speed.

According to some forms, the processor may display, on the display, regions, which is to mark the present relative lateral speed, of the bar graph in colors distinguished depending on levels of the dangerous situation.

According to some forms, the processor may display, on the display, the present relative lateral distance of the preceding vehicle together with the target relative lateral speed and the present relative lateral speed.

According to some forms, the processor may display, on the display, a vehicle icon based on the present relative lateral distance of the preceding vehicle on the bar graph or display the present relative lateral distance in numerical value.

According to some forms, the processor may display, on the display, information desired for the steering control depending on the target relative lateral speed, the present relative lateral speed to the preceding vehicle, and the dangerous situation determination result.

According to some forms, the processor may calculate the target relative lateral speed using a target time of alignment determined depending on the present relative lateral distance and a driving situation.

According to some forms, the processor may determine a present level as a first level having a lower dangerousness and display the bar graph in first color, when the target relative lateral speed is equal to the present relative lateral speed, and a relative lateral distance of the preceding vehicle is equal to or less than a preset reference value.

According to some forms, the processor may determine the present level as a second level having dangerousness higher than the dangerousness of the first level and display the bar graph in second color different from the first color, when a difference between the target relative lateral speed and the present relative lateral speed is greater than the first reference value and equal to or less than a second reference value and when the target relative lateral speed and the present relative lateral speed are positioned in opposition to each other based on a reference point of a bar graph.

According to some forms, the processor may determine the present level as a third level having dangerousness higher than the dangerousness of the second level and display the bar graph in third color different from the first and second colors, when the difference between the target relative lateral speed and the present relative lateral speed is greater than the second reference value.

According to some forms, the processor may determine the present level as a third level having dangerousness higher than the dangerousness of the second level and display the bar graph in third color different from the first and second colors, when the difference between the target relative lateral speed and the present relative lateral speed is greater than the second reference value.

According to some forms, the processor may display, on the display, information on a lane covered by the preceding vehicle using lane information measured by the preceding vehicle.

According to some forms, the processor may provide a lane departure warning by converting the lane information, which is measured by the preceding vehicle into lane information viewed in a viewpoint of a host vehicle, and calculating a lane departure predicted time point using the converted lane information, which is viewed in the viewpoint of the host vehicle, a predicted driving route of the host vehicle, a speed of the host vehicle.

According to some forms, the processor may display, on the display, at least one of the converted lane information which is viewed in the viewpoint of the host vehicle, the lane information measured by the host vehicle, a position, which is measured by the host vehicle, of the preceding vehicle, or the lane departure warning.

According to some forms, the processor may display, on the display, precise map based lane information and a position of the preceding vehicle on the lane information, and perform a lane departure warning by calculating a lane departure predicted time point using a predicted driving route of a host vehicle and a speed of the host vehicle.

According to some forms, the processor may display, on the display, steering angle information and lane departure information of the preceding vehicle, which are received from the preceding vehicle.

According to some forms, the processor may display, on the display, information on a curvature of a front lane covered by the preceding vehicle using lane information, which is measured by the preceding vehicle, received from the preceding vehicle.

Another aspect of the present disclosure, a method for displaying steering information may include coordinating the steering information of a preceding vehicle in platooning of vehicles, and displaying the steering information of the preceding vehicle.

According to some forms, the displaying of the steering information of the preceding vehicle may include performing a control operations to calculate a target relative lateral speed using a present relative lateral distance to the preceding vehicle, to display, on a display, the target relative lateral speed and a present relative lateral speed to the preceding vehicle, to determine a dangerous situation resulting from steering control, and to display a dangerous situation determination result.

According to some forms, the displaying of the steering information of the preceding vehicle may include performing a control operation to display information on a lane covered by the preceding vehicle using lane information measured by the preceding vehicle.

According to some forms, the displaying of the steering information of the preceding vehicle may include provide a lane departure warning by converting the lane information, which is measured by the preceding vehicle into lane information viewed in a viewpoint of a host vehicle, and calculating a lane departure predicted time point using the converted lane information, which is viewed in the viewpoint of the host vehicle, a predicted driving route of the host vehicle, a speed of the host vehicle.

According to some forms, the displaying of the steering information of the preceding vehicle may include performing a control operation to display at least one of the converted lane information which is viewed in the viewpoint of the host vehicle, the lane information measured by the host vehicle, a position, which is measured by the host vehicle, of the preceding vehicle, or the lane departure warning.

According to some forms, the displaying of the steering information of the preceding vehicle may include performing a control operation to display precise map based lane information and a position of the preceding vehicle on the lane information, and provide a lane departure warning by calculating a lane departure predicted time point using a predicted driving route of a host vehicle and a speed of the host vehicle.

According to some forms, the displaying of the steering information of the preceding vehicle may include performing a control operation to display a curvature of a front lane covered by the preceding vehicle by using steering angle information and lane departure warning information of the preceding vehicle, and lane information measured by the preceding vehicle, which are received from the preceding vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7A:
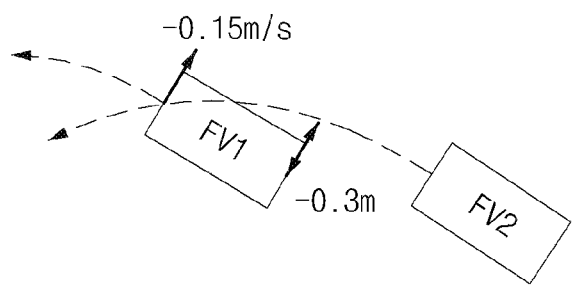
Figure 7B:
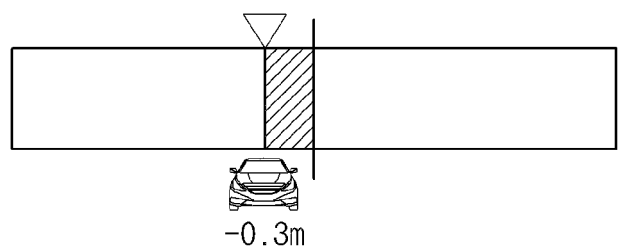
Figure 7C:
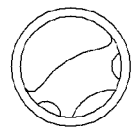
Figure 8A:
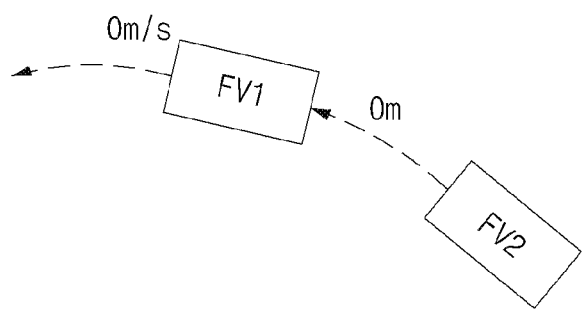
Figure 8B:
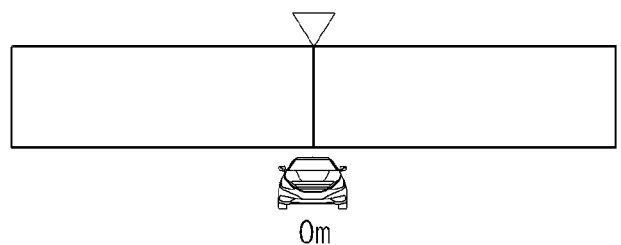
Figure 8C:
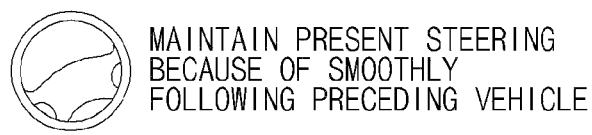
Figure 9A:
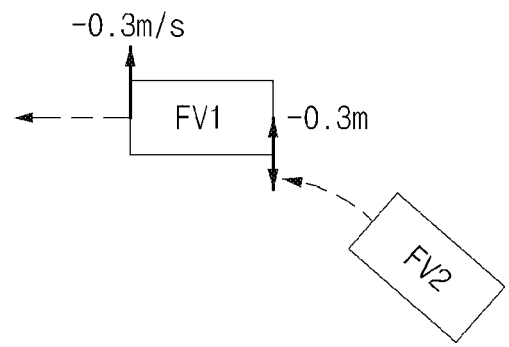
Figure 9B:
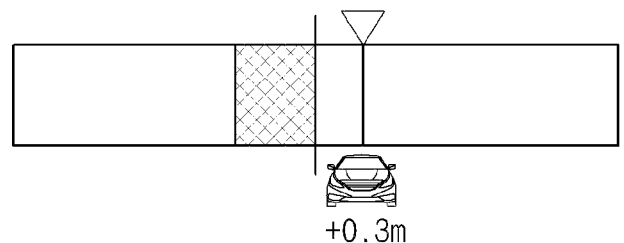
Figure 9C:
Figure 10A:
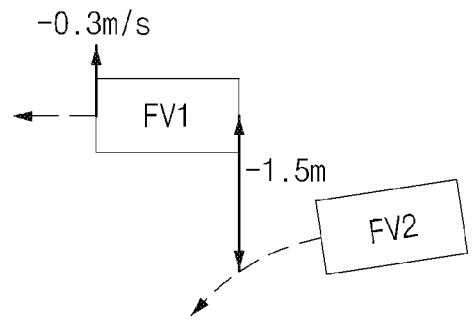
Figure 10B:
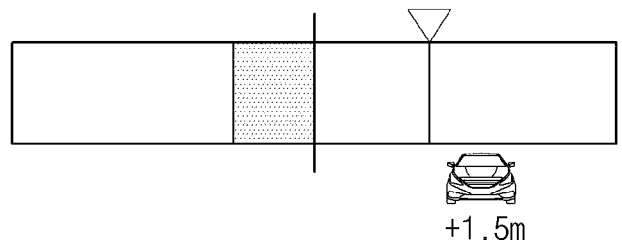
Figure 10C:
Figure 11A:
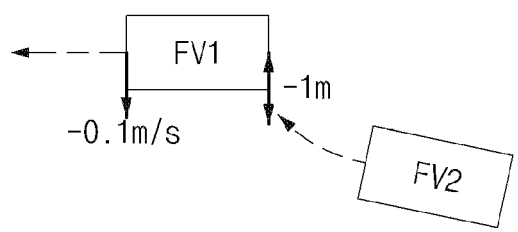
Figure 11B:
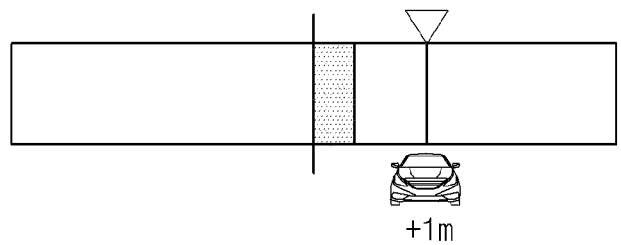
Figure 11C:
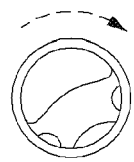
Figures 12A, 12B:
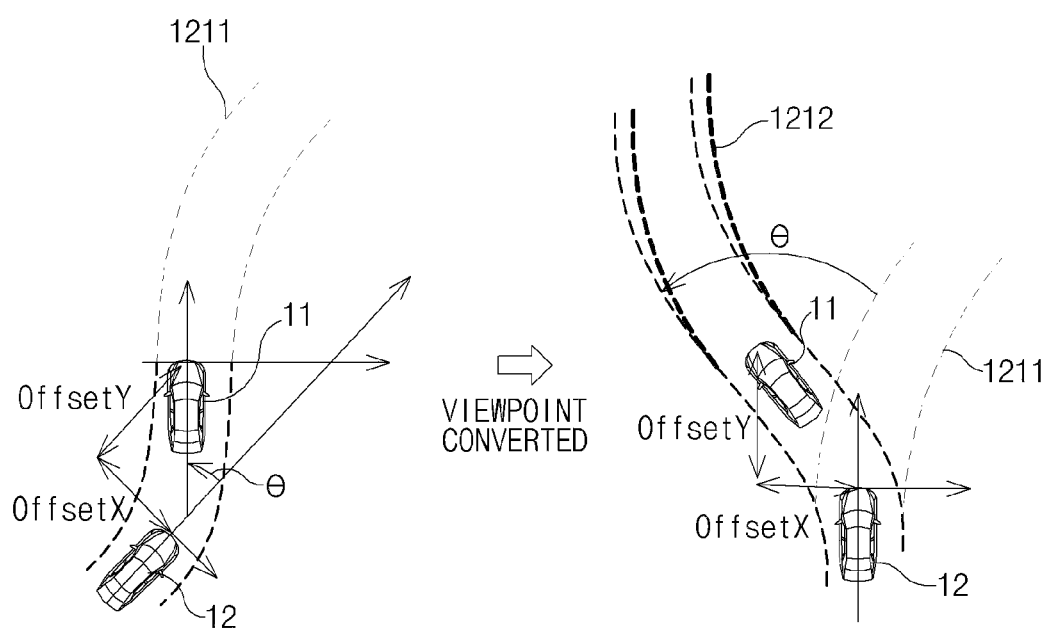
Figure 13A:
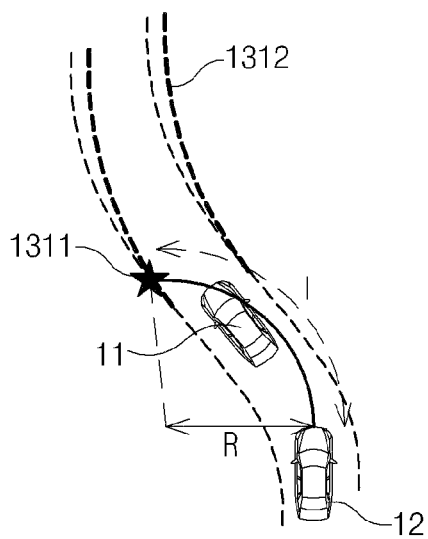
Figure 13B:
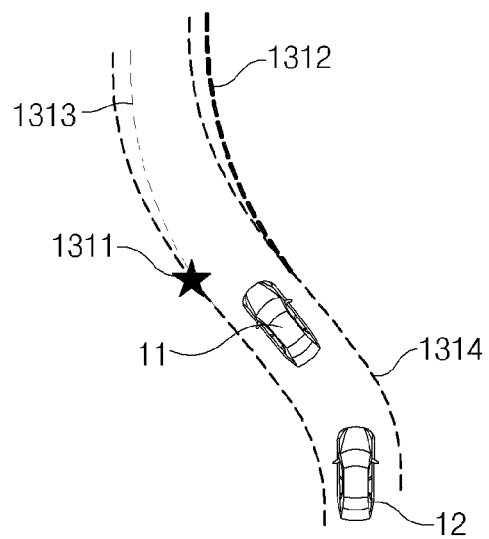
Figure 14:
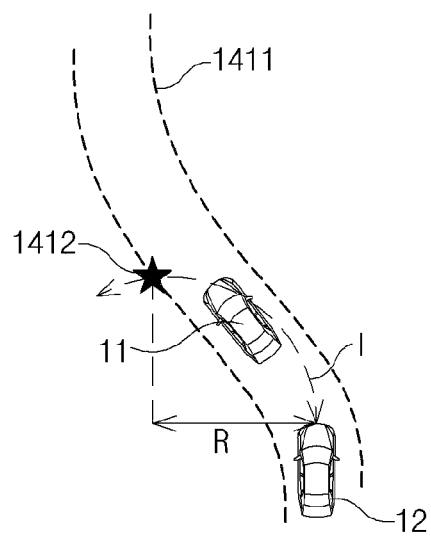
Figure 16:
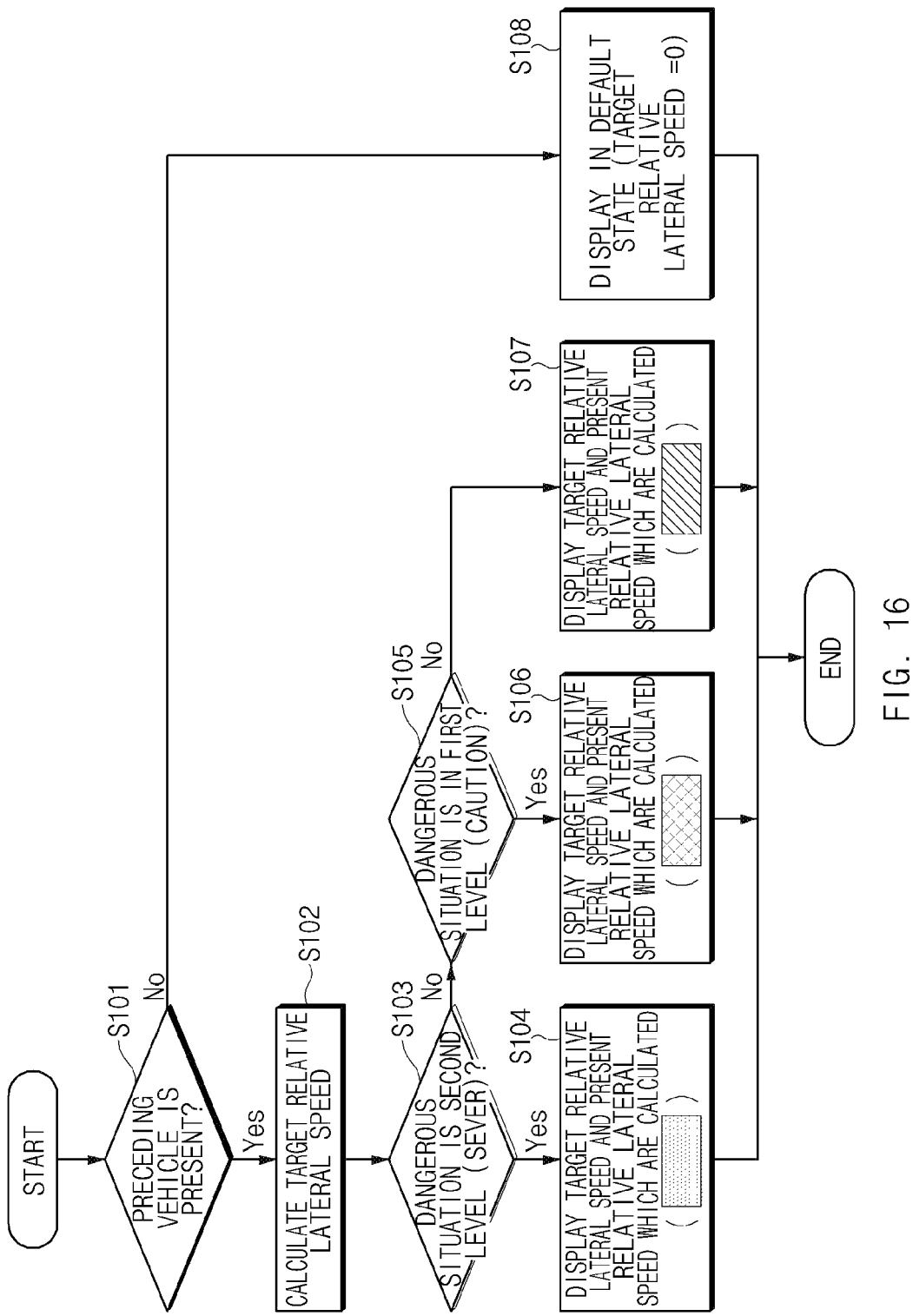
Figure 17:
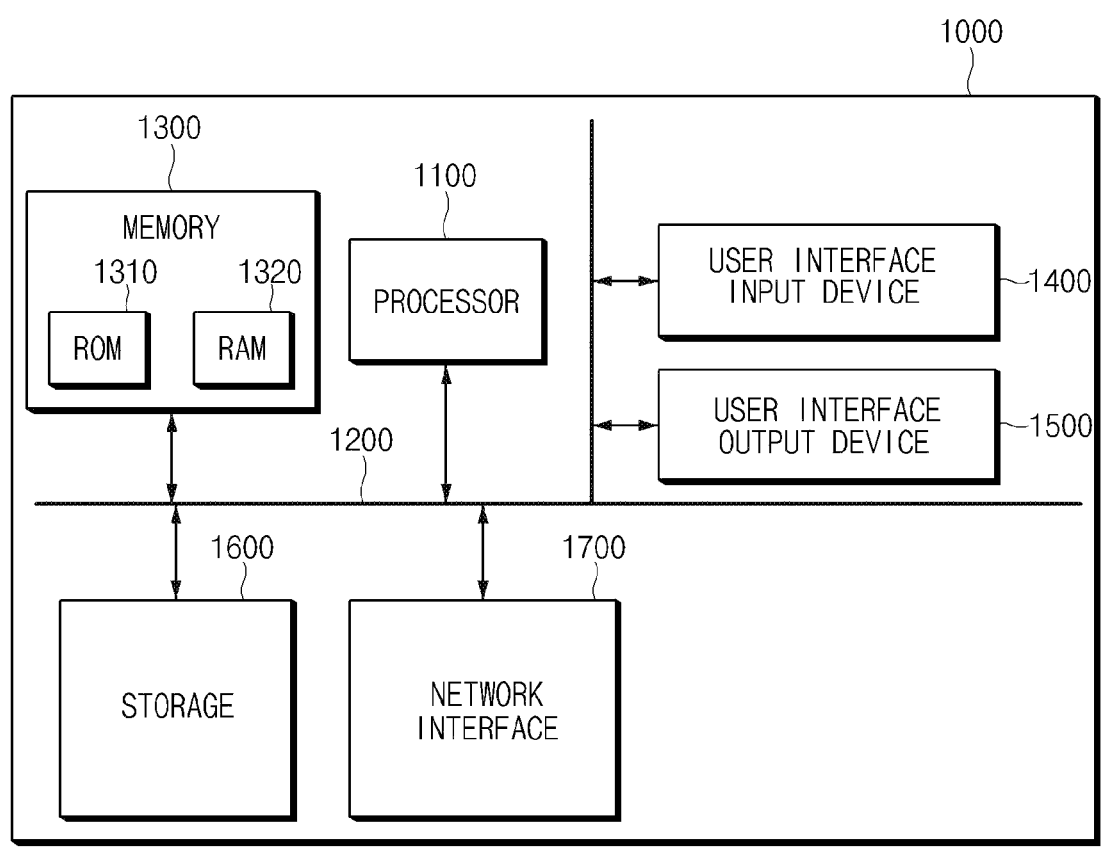

FIGS. 7A, 7B and 7C are views illustrating that the steering of the preceding vehicle is displayed when the difference in present relative lateral distance between the following vehicle and the preceding vehicle is made even though the present relative lateral speed becomes equal to the target relative lateral speed as the following vehicle continuously perform the steering to the left to follow the preceding vehicle, according to one form of the present disclosure;

FIGS. 8A, 8B and 8C are views illustrating that the steering of the preceding vehicle is displayed when the preceding vehicle is followed on a curved road, according to the first form of the present disclosure;

FIGS. 9A, 9B and 9C are views illustrating that the steering of the preceding vehicle is displayed when the preceding vehicle enters to a linear road from a curved road, so the present relative lateral distance and the desired speed start to be coordinated, according to the first form of the present disclosure;

FIGS. 10A, 10B and 10C are views illustrating that the steering of the preceding vehicle is displayed, when the relative lateral speed and the present relative lateral distance are rapidly increased by maintaining a present steering state as a driver fails to recognize that the steering control to the right is necessary, even though the steering control to the right is necessary, according to one form of the present disclosure;

FIGS. 11A, 11B and 11C are views illustrating that the steering of the preceding vehicle is displayed when the following vehicle recognizes a dangerous situation and rapidly performs the steering control to the right, according to the first form of the present disclosure;

FIGS. 12A and 12B are views illustrating the procedure of converting lane information, which is measured by the preceding vehicle, into lane information viewed in the viewpoint of the following vehicle, according to a second form of the present disclosure;

FIGS. 13A and 13B are views illustrating that the steering information of the preceding vehicle is displayed based on the lane information measured by the preceding vehicle, according to the second form of the present disclosure;

FIG. 14 is a view illustrating that precise map based steering information of a preceding vehicle, according to a third form of the present disclosure;

FIGS. 15A, 15B, 15C and 15D are views illustrating steering information of a preceding vehicle based on steering angle information received from a preceding vehicle, according to a fourth form of the present disclosure;

FIG. 16 is a flowchart illustrating a method for displaying steering information of a preceding vehicle, according to one form of the present disclosure; and FIG. 17 is a view illustrating a computing system, according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

In platooning of vehicles, a leading vehicle (LV) and a following vehicle (FV) included in a platooning group may perform platooning on a road. The LV and the FV may travel while maintaining a specific distance therebetween. The LV or the FV may adjust the distance between the LV and the FV while during. The LV or the FV may increase or decrease the inter-vehicle distance depending on the manipulation of a driver.

The present disclosure discloses a technology of determining, in advance, and displaying a steering control situation and a dangerous situation of a preceding vehicle so as to control steering in platooning of vehicles, thereby allowing a driver to recognize the steering control situation and the dangerous situation of the preceding vehicle and to perform steering control.

Therefore, according to the present disclosure, the FV may include all FVs other than the LV. Hereinafter, the preceding vehicle and the following vehicle will be referred to as "FV1" and "FV2", respectively.

Hereinafter, forms of the disclosure will be described in detail with reference to FIGS. 1 to 17.

Figure 1:
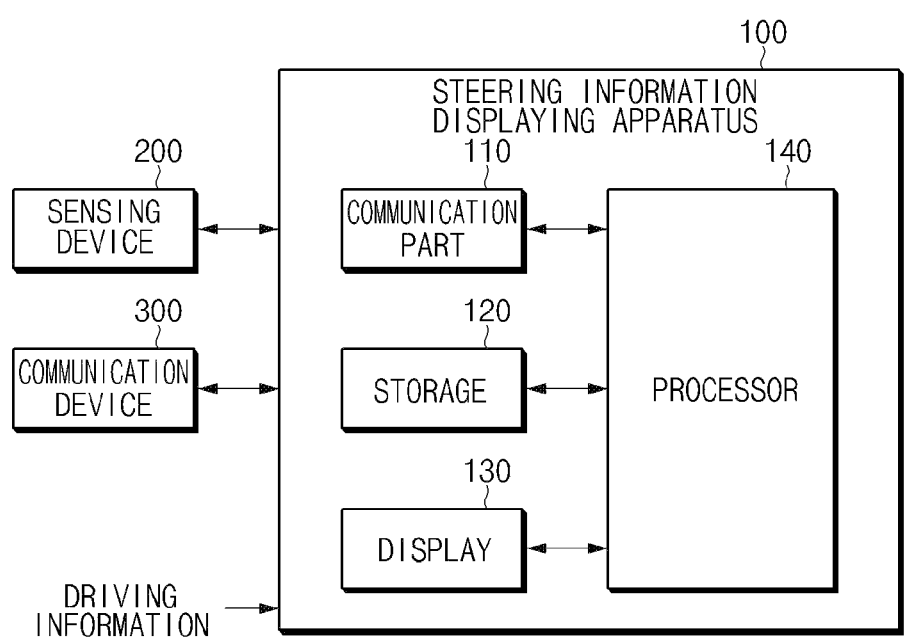
FIG. 1 is a block diagram illustrating the configuration of a vehicle system including an apparatus for displaying steering information in platooning of vehicles in one form of the present disclosure.

FIG. 1 is a block diagram illustrating the configuration of a vehicle system including an apparatus (steering information displaying apparatus) 100 for displaying steering information in platooning of vehicles, according to one form of the present disclosure.

The steering information displaying apparatus 100 may be mounted in all vehicles in a platoon. Hereinafter, an example that the steering information displaying apparatus 100 mounted in an FV2 in the platoon displays steering information of an FV1 (a front vehicle in immediately front of the FV2) will be described below according to the present disclosure.

The steering information displaying apparatus 100 may coordinate steering information of the preceding vehicle and display the steering information of the preceding vehicle such that a driver recognize the steering information of the preceding vehicle, when a front lane is not viewed as the front lane is covered by the preceding vehicle in the platooning of the vehicle. In addition, the steering information displaying apparatus 100 may determine a dangerous situation resulting from steering control and display the dangerous situation, thereby allowing the driver to prepare for the dangerous situation.

In this case, the steering information may include a present relative lateral speed to the preceding vehicle, a target relative lateral speed to the preceding vehicle, a dangerous situation, lane information obtained through viewpoint-converted using the lane information measured by the preceding vehicle, precise map based lane information, steering angle information of the preceding vehicle, and lane departure warning information.

To this end, the steering information displaying apparatus 100 may include a communication part 110, a storage 120, a display 130, and a processor 140.

The communication part 110 is a hardware device implemented with various electronic circuits to transmit and receive a signal through wireless or wired connection. According to the present disclosure, the communication part 110 may make in-vehicle communication through controller area network (CAN) communication or local interconnect network (LIN) communication, and Ethernet communication. The communication part 110 may receive driving information (e.g., a speed or a yaw rate) when determining the dangerous situation through communication with devices inside a vehicle and provide the driving information to the processor 140.

The storage 120 may store a sensing result of the sensing device 200 and information (e.g., a first reference value or a second reference value) for determining a dangerous degree by the processor 140. The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The display 130 may be controlled by the processor 140 to display a target relative lateral speed, a present relative lateral speed, and a dangerous situation in the form of bar graphs varied depending on colors, and may display a screen for guidance of steering control. The display 130 may be implemented with a head up display (HUD), a cluster, an audio video navigation (AVN), a human machine interface (HMI), or a vehicle windshield display. In addition, the display 130 may include at least one of a liquid crystal display (LCD), a thin film transistor-liquid crystal display (TFT LCD), a light emitting diode (LED), an organic light-emitting diode (OLED), an active matrix OLED (AMOLED), a flexible display, a bended display, or a third dimension (3D) display. Among them, some displays may be implemented with transparent displays configured in a transparent type or a translucence type such that the displays are viewed from the outside. In addition, the display 130 is implemented with a touchscreen including a touch panel to be used as an input device in addition to an output device.

The processor 140 may be electrically connected with the communication part 110, the storage 120, the display 130, and the like, may electrically control each component, may be an electric circuit. Accordingly, the processor 140 may perform various data processing and calculation, to be described below.

The processor 140 may calculate the target relative lateral speed using the present relative lateral distance to the preceding vehicle, may determine a dangerous level based on the target relative lateral speed, the yaw rate, the present relative lateral speed, the present relative lateral distance, or the lane departure time, and may display, on the display 130, the target relative lateral speed, the present relative lateral speed to the preceding vehicle, and the dangerous level in the form of a bar graph. In this case, a condition for determining a dangerous situation is not limited thereto, and the processor 140 may determine the dangerous situation using various conditions. In this case, the processor 140 may calculate a target relative lateral speed using a target time of alignment determined depending on the present relative lateral distance and the driving situation.

The processor 140 may display, on the display, the target relative lateral speed and the present relative lateral speed on the bar graph representing a minus direction at the right of a reference point on the bar graph and representing a plus direction at the right direction of the reference point on the bar graph. In addition, the processor 140 may display the target relative lateral speed and the present relative lateral speed on the bar graph together with the present target relative lateral distance. The processor 140 may display, on the display 130, a vehicle icon based on the present relative lateral distance of the preceding vehicle on the bar graph or may display the present relative lateral distance in numerical value on the display 130.

The processor 140 may display, on the display 130, the target relative lateral speed having a triangular mark and a solid line marked on the bar graph, and the present relative lateral speed in a bar type.

The processor 140 may display a target relative lateral speed region, which is defined as the specific range of the target relative lateral speed, marked on the bar graph on the display 130. In this case, the processor 140 may determine the size of the target relative lateral speed region based on the difference between the target relative lateral speed and the present relative lateral speed. In this case, the target relative lateral speed range may be varied depending on the driving condition. In other words, the processor 140 may widely display the target relative lateral speed region to allow a driver to intuitively recognize that a situation is relaxed when the difference between the target relative lateral speed and an actual lateral speed is small. To the contrary, when the difference between the target relative lateral speed and the actual lateral speed is great, the processor 140 may narrowly display the target relative lateral speed region to allow the driver to intuitively recognize that the situation is urgent.

The processor 140 may display, on the display 130, the regions, which is to mark the present relative lateral speed, of the bar graph in various colors or hatching manners distinguished depending on levels of the dangerous situation.

The processor 140 may display, on the display 130, information desired for the steering control depending on the target relative lateral speed, the present relative lateral speed to the preceding vehicle, and information desired for steering control resulting from the determination result of the dangerous situation.

The processor 140 may determine a present level as a first level (safe level) having a lower dangerousness and may display the bar graph in first color on the display 130, when the target relative lateral speed is equal to the present relative lateral speed, and the relative lateral distance of the preceding vehicle is equal to or less than a preset reference value.

The processor 140 may determine the present level as a second level having dangerousness higher than the dangerousness of the first level and may display the bar graph in second color different from the first color on the display 130, when the difference between the target relative lateral speed and the present relative lateral speed is greater than the first reference value and equal to or less than a second reference value, and when the target relative lateral speed and the present relative lateral speed are positioned in opposition to each other based on the reference point of the bar graph.

The processor 140 may determine the present level as a third level dangerousness higher than the dangerousness of the second level and may display the bar graph in third color different from the first and second colors on the display 130, when the difference between the target relative lateral speed and the present relative lateral speed is greater than the second reference value.

The processor 140 may determine the present level as the third level in dangerous higher than the second level and may display the bar graph in third color different from the first and second colors on the display 130, when the difference between the target relative lateral speed and the present relative lateral speed is greater than the first reference value and less than the second reference value.

In this case, the first reference value and the second reference value for determining the dangerous degree may be previously calculated based on experimental values. In addition, the first color, the second color, and the third color may be set to Green, Yellow, and Red, respectively, but the present disclosure is not limited thereto. In other words, the first color, the second color, and the third color may be set to different colors from the above colors if desired.

The processor 140 may display, on the display 130, information on a lane covered by the preceding vehicle using lane information measured by the preceding vehicle. In other words, the processor 140 may perform a control operation such that the information on the lane covered by the preceding vehicle is displayed by converting the lane information measured by the preceding vehicle lane information which is viewed in the view point of the host vehicle. In this case, the processor 140 may provide a lane departure warning by calculating a lane departure predicted time point using the lane the converted information which is viewed in the viewpoint of the host vehicle, the predicted driving route of the host vehicle, and the speed of the host vehicle. The processor 140 may display the positions of the preceding vehicle and the host vehicle on the front lane information obtained by converting the lane information, which is measured by the preceding vehicle, in the viewpoint and may display the lane departure time point. Accordingly, the processor 140 may display, on the display 130, at least one of the converted lane information which is viewed in the viewpoint of the host vehicle, the lane information measured by the host vehicle, the position, which is measured by the host vehicle, of the preceding vehicle measured, or the lane departure warning.

The processor 140 may display, on the display 130, precise map based lane information and the position of the preceding vehicle on the lane information, and may perform the lane departure warning by calculating the lane departure predicted time point using the predicted driving route of the host vehicle and the speed of the host vehicle. The processor 140 may obtain and display lane information from a precision map provided in the vehicle, may display front lane information and positions of the preceding vehicle and the host vehicle on the front lane information, and may display a lane departure point, and a lane departure time point.

The processor 140 may display, on the display 130, the steering angle information and lane departure information of the preceding vehicle, which are received from the preceding vehicle.

The processor 140 may receive the steering angle information and the lane departure information of the preceding vehicle from the preceding vehicle through V2V communication. In addition, the processor 140 may display the curvature of the front lane covered by the preceding vehicle using the steering angle information of the preceding vehicle and the front lane information measured by the preceding vehicle.

The sensing device 200 may sense a relative lateral distance to the preceding vehicle, a relative lateral speed to the preceding vehicle, a yaw rate of the host vehicle, or the lane departure time and may provide the relative lateral distance, the relative lateral speed, the yaw rate, and the lane departure time to the steering information displaying apparatus 100. To this end, the sensing device 200 may include an ultrasonic sensor, a radar, a camera, a laser scanner or a corner radar, a LiDAR, an acceleration sensor, a yaw rate sensor, a torque measurement sensor or a wheel speed sensor, and a steering angle sensor.

A communication device 300 may be configured to make communication with the outside and may make the wireless communication with vehicles in the platoon through V2V communication. To this end, the communication device 300 may include various communication units such as a mobile communication unit, a broadcast receiving unit such as a digital multimedia broadcasting (DMB) module or a digital video broadcasting-handheld (DVB-H) module, a short-range communication unit such as a ZigBee module or a near field communication (NFC) module, which is a Bluetooth module, and a Wi-Fi communication unit.

Figure 2:
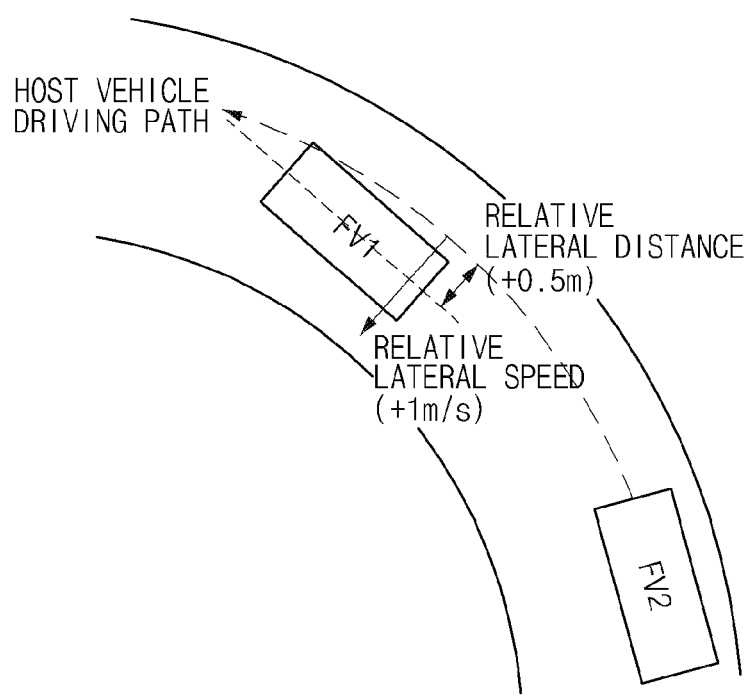
FIG. 2 is a view illustrating a method for calculating a target relative lateral speed in a first form of the present disclosure.

FIG. 2 is a view illustrating a method for calculating a target relative lateral speed, according to a first form of the present disclosure.

Referring to FIG. 2, when the FV2 exactly follows the FV1 in platooning, a present relative lateral distance and a relative lateral speed should be zero. In this case, to make the present relative lateral distance to be zero, the steering information displaying apparatus 100 requires a target relative lateral speed which has the size proportional to the size of the present relative lateral distance and represents a direction opposite to the direction of the present relative lateral distance. The steering information displaying apparatus 100 may calculate the target relative lateral speed using a target time of alignment taken to align the FV1 and the FV2 according to Equation 1.

$$\text{Target relative transverse speed} = \frac{(-1 * \text{present relative transverse distance})}{\text{alignment target time}} \quad \text{Equation 1}$$

As in Equation 1, the steering information displaying apparatus 100 may calculate the target relative lateral speed by multiplying the present relative lateral distance by '−1', and dividing the result by the target time of alignment.

In this case, the target time of alignment may vary depending on the present speed, the yaw rate, the present relative lateral distance, or the lane departure predicted time.

When the driver performs the steering control of the vehicle based on the calculated target relative lateral speed, the present relative lateral distance gradually decreases and converges to zero. When the present relative lateral distance becomes zero, the target relative lateral speed becomes zero. Accordingly, the present relative lateral speed becomes zero, so the FV2 may exactly follow the FV1.

Figure 3A:
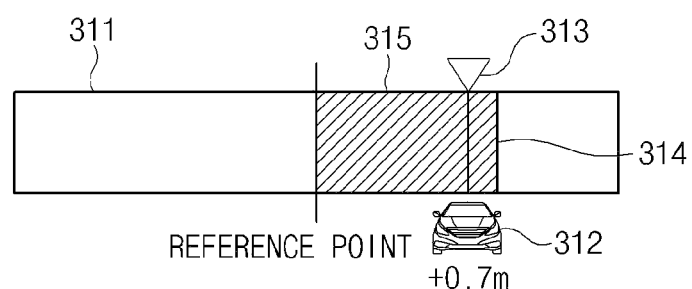
FIGS. 3A and 3B are views respectively illustrating a screen to display the steering information of a proceeding vehicle, according to the first foam of the present disclosure.
Figure 3B:
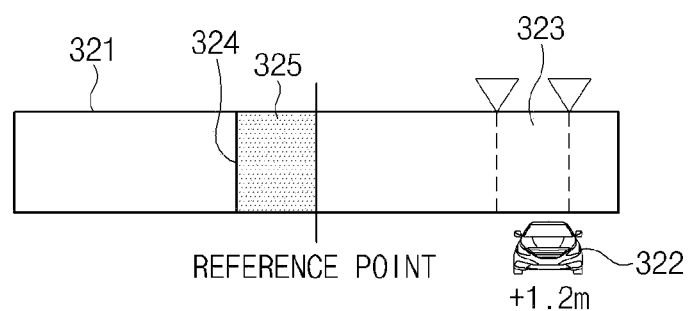

FIGS. 3A and 3B are views respectively illustrating a screen to display the steering information of the preceding vehicle, according to the first foam of the present disclosure.

Referring to FIG. 3A, the steering information displaying apparatus 100 may display a present relative lateral distance 312 of a vehicle, a target relative lateral speed 313, and a present relative lateral speed 314 on a bar graph 311.

The steering information displaying apparatus 100 may display the present relative lateral distance in a numeric value on the bar graph 311, may display a vehicle icon 312 at a position of the bar graph corresponding to the present relative lateral distance, and may move the position of the vehicle icon 312 depending on the variation of the present relative lateral distance. In this case, a driver frequently recognizes a right vehicle as being in the plus (+) direction. Accordingly, the steering information displaying apparatus 100 may display the host vehicle such that the right of the host vehicle represents the plus value of the present relative lateral distance on the bar graph 311.

The steering information displaying apparatus 100 may display the target relative lateral speed 313 of the vehicle using a triangular mark and a solid line on the bar graph 311. In this case, since the target relative lateral speed is proportional to '−1' *(present relative lateral distance), the target relative lateral speed and the vehicle icon 312 may be positioned at the same positions.

The steering information displaying apparatus 100 may display the present relative lateral speed 314 by adjusting the length of a bar on the bar graph 311.

In addition, the steering information displaying apparatus 100 may apply a color or perform hatching with respect to a region, which is referred to as the present relative lateral speed region 315, from a reference point to a position of representing the present relative lateral speed 314. In this case, the steering information displaying apparatus 100 may display the present relative lateral speed region 315 in red when determining that a present situation is severely dangerous. When the present situation is slightly dangerous, the steering information displaying apparatus 100 may display the present relative lateral speed region 315 in yellow. When the present situation is normal, the steering information displaying apparatus 100 may display the present relative lateral speed region 315 in green.

Referring to FIG. 3B, the steering information displaying apparatus 100 may display the present relative lateral distance 322 of the vehicle, the target relative lateral speed 323, and the present relative lateral speed 324 on the bar graph 321.

In other words, the steering information displaying apparatus 100 may display a specific region of the target relative lateral speed as the target relative lateral speed region 323, and the specific range may be varied depending on the driving conditions. In this case, the processor 140 may widely display the target relative lateral speed region to allow a driver to intuitively recognize that a situation is relaxed when the difference between the target relative lateral speed and an actual lateral speed is small. To the contrary, when the difference between the target relative lateral speed and the actual lateral speed is great, the processor 140 may narrowly display the target relative lateral speed region to allow the driver to intuitively recognize that the situation is urgent.

The steering information displaying apparatus 100 may determine the present situation as the dangerous situation, and may display the present relative lateral speed 325 in red when the difference between the target relative lateral speed and the present relative lateral speed is greater than a specific second reference value as the present relative lateral speed 324 is positioned in opposition to the target relative lateral speed region 323 on the bar graph 321.

Hereinafter, an example of displaying steering information of the preceding vehicle in platooning will be described with reference to FIGS. 4 to 11 according to a first form of the present disclosure.

Figure 4A:
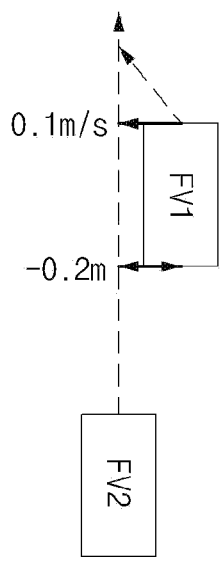
FIGS. 4A, 4B and 4C are views illustrating that the steering of the preceding vehicle is displayed when the preceding vehicle is followed on a linear road, according to the first form of the present disclosure.
Figure 4B:
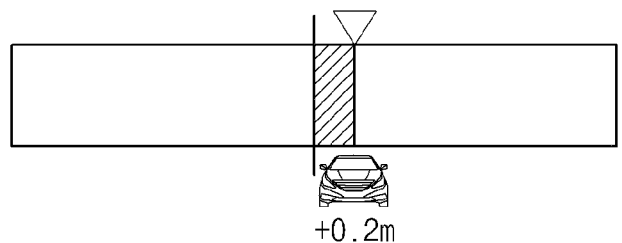
Figure 4C:
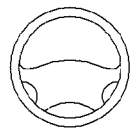

FIGS. 4A, 4B and 4C are views illustrating that the steering of the preceding vehicle is displayed when the preceding vehicle is followed on a linear line, according to a first form of the present disclosure.

The following description will be made with reference to FIG. 4A, regarding that the FV1 is slightly moving to the left when the FV2 follows the FV1 on the linear road. For example, it is assumed that the target time of alignment is two seconds when the present relative lateral speed is 0.1 m/s (the FV1 is slightly moving to the left) and the present relative lateral distance is −0.2 m (the FV1 is slightly away to the right from the central line of the FV2, which is a host vehicle), based on the FV2. The target relative lateral speed is calculated through −1*(−0.2)/2 to become 0.1.

In other words, the steering information displaying apparatus 100 may determine a present state as a safe state as illustrated in FIG. 4B because the FV1 is moving to the left although the FV1 is at the right, and the present relative lateral speed is equal to the target relative lateral speed. Accordingly, the steering information displaying apparatus 100 may display the present relative lateral speed region in green on the bar graph and may display a screen for guiding the present steering to be maintained as illustrated in FIG. 4C.

Figure 5A:
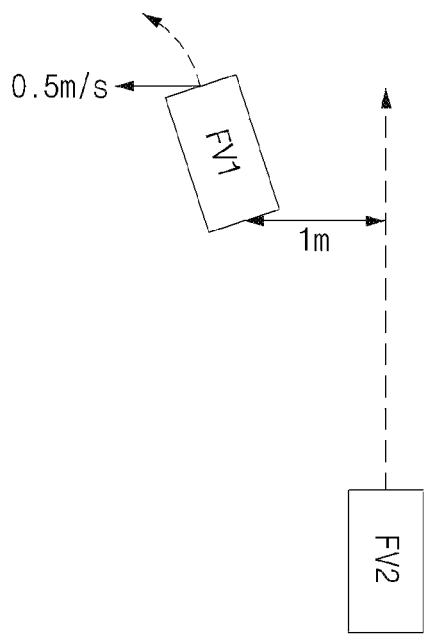
FIGS. 5A, 5B and 5C are views illustrating that the steering of the preceding vehicle is displayed when the preceding vehicle enters a left curved road, according to the first form of the present disclosure.
Figure 5B:
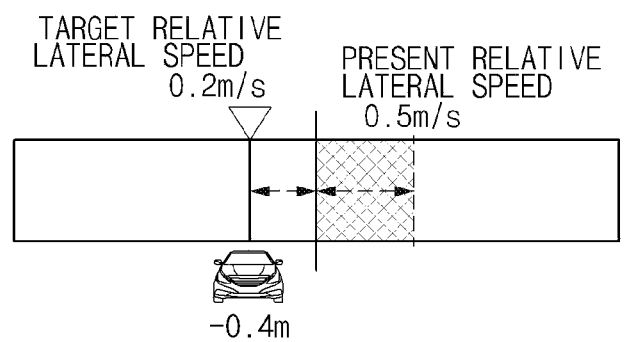
Figure 5C:
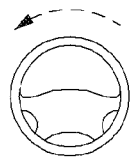

FIGS. 5A, 5B and 5C are views illustrating that the steering of the preceding vehicle is displayed when the preceding vehicle enters a left curved road, according to the first form of the present disclosure.

Referring to FIG. 5A, although the FV1 enters the left curved road, the FV2 is maintained straight, so the present relative lateral distance and the present relative lateral speed start to be coordinated between the FV1 and the FV2.

For example, when the preceding vehicle FV1 is moving to the left at the present relative lateral speed of 0.5 m/s, the FV1 is to the left with the present relative lateral distance of 0.4 m, and the target time of alignment is 2 seconds, the target relative lateral speed become −0.2 through −1*(0.4)/2.

In other words, the FV1 is to the left from the central line of the FV2. In this case, since the FV1 keeps moving to the left away from the central line of the FV2, the steering control to the left is desired. In addition, the steering information displaying apparatus 100 may determine a present situation as a slightly dangerous situation, when the target relative lateral speed and the present relative lateral speed are positioned in opposition to each other based on the reference point on the bar graph and when the difference between the target relative lateral speed and the present relative lateral speed is greater than the first reference value and less than the second reference value as in FIG. 5B. Accordingly, the steering information displaying apparatus 100 may display the present relative lateral speed in yellow on the bar graph.

In addition, the steering information displaying apparatus 100 requires the steering control to the left to match the present relative lateral speed to the target relative lateral speed as in FIG. 5C, and a driver recognizing the screens as in FIGS. 5B and 5C may perform the steering control as in FIG. 5C.

Figure 6A:
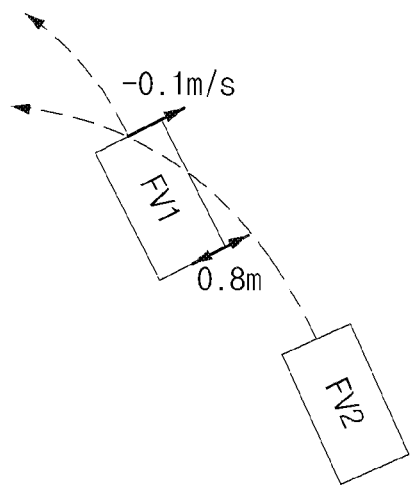
FIGS. 6A, 6B and 6C are views illustrating that the steering of the preceding vehicle is displayed when the present relative lateral distance is further increased during steering to the left to follow the preceding vehicle, according to the first form of the present disclosure.
Figure 6B:
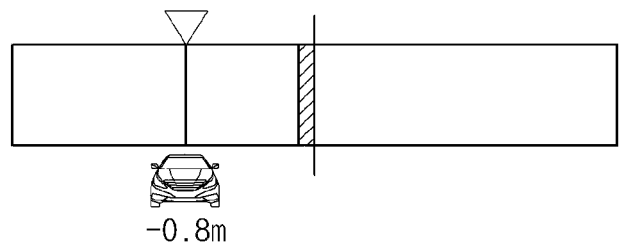
Figure 6C:
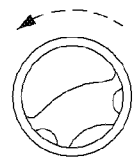

FIGS. 6A, 6B and 6C are views illustrating that the steering of the preceding vehicle is displayed when the present relative lateral distance is further increased while the following vehicle is steering to the left to follow the preceding vehicle, according to the first form of the present disclosure.

Referring to FIG. 6A, when the present relative lateral distance is increased although the relative lateral speed between the FV1 and the FV2 is decreased as the FV2 performs steering to the left to follow the FV1, the steering control to the left is continuously desired.

For example, although the FV1 starts to move to the right with the present relative lateral speed of −0.1 m/s, when the FV1 is significantly away to the left from the FV2 with the present relative lateral distance of 0.8 m and the target time of alignment is two seconds, the target relative lateral speed becomes '−0.4' through −1*(0.8)/2.

As the difference between the target relative lateral speed and the present relative lateral speed is more decreased when compared to FIG. 5, the steering information displaying apparatus 100 may determine the present state as the safe state to display the present relative lateral speed region in green on the bar graph as in FIG. 6B. In addition, since the target relative lateral speed is less than the present relative lateral speed, the steering information displaying apparatus 100 may display that the steering to the left is desired such that the present relative lateral speed is followed the target relative lateral speed as in FIG. 6B.

FIGS. 7A, 7B and 7C are views illustrating an example of displaying the steering of the preceding vehicle when the difference in present relative lateral distance between the following vehicle and the preceding vehicle is made even though the present relative lateral speed becomes equal to the target relative lateral speed as the following vehicle continuously performs the steering to the left to follow the preceding vehicle, according to the first form of the present disclosure.

Referring to FIG. 7A, the present relative lateral distance fails to converge to zero even though the present relative lateral speed becomes equal to the target relative lateral speed as the following vehicle continuously performs the steering to the left under the situation of FIG. 6C.

For example, the target relative lateral speed becomes −0.15 through −1*(0.3)/2, when the FV1 is moving to the right from the FV2 with the present relative lateral speed of −0.15 m/s, when the FV1 is slightly away to the left from the FV2 with the present relative lateral distance of 0.3 m, and when the target time of alignment is two seconds.

In other words, the steering information displaying apparatus 100 determines a present state as a safe state to display the present relative lateral speed region in green on the bar graph because the target relative lateral speed is equal to the present relative lateral speed as in FIG. 7B. In addition, the steering information displaying apparatus 100 may display a screen for performing guidance such that the present steering is maintained as in FIG. 7C because the FV1 is moving to the right although the FV1 is to the left from the FV2, and the present relative lateral speed is equal to the target relative lateral speed.

FIGS. 8A, 8B and 8C are views illustrating that the steering of the preceding vehicle is displayed when the preceding vehicle is followed on a curved road, according to the first form of the present disclosure.

Referring to FIG. 8A, the FV2 continuously follows the FV1 by continuously performing steering control at the target relative lateral speed on the curved road.

For example, the target relative lateral speed becomes 0 through −1*(0)/2, because the FV1 has a lateral sped of 0 m/s, which is equal to that of the FV2, is aligned with the FV2 in line with the relative lateral distance of 0 m, and the target time of alignment is two seconds.

Since the present relative lateral speed and the present relative lateral distance are all zeros, the bar graph is shown as in FIG. 8B. In addition, since the FV2 exactly follows the FV1, a screen for performing guidance to maintain present steering may be displayed as in FIG. 8C.

FIGS. 9A, 9B and 9C are views illustrating that the steering of the preceding vehicle is displayed when the preceding vehicle enters to a linear road from a curved road, so the present relative lateral distance and the desired speed start to be coordinated, according to the first form of the present disclosure.

Referring to FIGS. 9 A, 9B and 9C, steering information is displayed when the preceding vehicle enters a linear section, so the present relative lateral distance and the present relative lateral speed start to be coordinated.

For example, as in FIG. 9A, the target relative lateral speed becomes 0.15 through −1*(−0.3)/2, when the FV1 is moving to the right from the FV2 at the present relative lateral speed of −0.3 m/s, when the FV1 is slightly away to the right from the FV2 with the present relative lateral distance of −0.3 m, and when the target time of alignment is two seconds.

The steering information displaying apparatus 100 may determine the present situation as the slightly dangerous situation, when the present relative lateral speed is positioned in opposition to the target relative lateral speed on a bar graph, and when the difference between the target relative lateral speed and the present relative lateral speed is greater than the first reference value, which is preset, and less than the second reference value, the steering information displaying apparatus 100 may display a present relative lateral speed region in yellow on the bar graph as in FIG. 9B.

The steering information displaying apparatus 100 may display a screen for performing guidance of steering control to the right as in FIG. 9C because the FV1 becomes away to the right from the FV2 while moving to the right, so the steering control to the right is desired.

FIGS. 10A, 10B and 10C are views illustrating that the steering of the preceding vehicle is displayed, when the relative lateral speed and the present relative lateral distance are rapidly increased by maintaining a present steering state as a driver fails to recognize that the steering control to the right is desired, even though the steering control to the right is desired.

Referring to FIG. 10A, the target relative lateral speed becomes 0.5 through −1*(−1.5)/3, when the FV1 is moving to the right from the FV2 at the present relative lateral speed of −0.3 m/s, when the FV1 is slightly away to the right from the FV2 with the present relative lateral distance of −1.5 m, and when the target time of alignment is three seconds. In this case, the steering information displaying apparatus 100 may limit the target relative lateral speed for saving and increase the target time of alignment.

Referring to FIG. 10B, the steering information displaying apparatus 100 may determine a present situation as a dangerous state and may display the present relative lateral speed region in red on the bar graph because the difference between the present relative lateral speed and the target relative lateral speed is greater than the second reference value which is preset.

The steering information displaying apparatus 100 may determine that the steering control to the right is desired and display a screen for performing guidance of steering control to the right as in FIG. 10C because the FV1 is to the right from the FV2 with a specific distance or more while continuously moving to the right.

FIGS. 11A, 11B and 11C are views illustrating that the steering of the preceding vehicle is displayed when the following vehicle recognizes a dangerous situation and rapidly performs the steering control to the right, according to one form of the present disclosure.

Referring to FIG. 11A, the target relative lateral speed becomes 0.5 through −1*(−1)/2, when the FV1 is moving to the left from the FV2 at the present relative lateral speed of 0.1 m/s, when the FV1 is slightly away to the right from the FV2 because the present relative lateral distance is −1 m, and when the target time of alignment is two seconds.

The steering information displaying apparatus 100 may determine the present situation as being continuously dangerous as the yaw rate of the host vehicle belongs to a dangerous range due to the rapid steering even though the difference between the target relative lateral speed and the present relative lateral speed is less than the second reference value, which is preset, and may display the present relative lateral speed region in red on the bar graph as in FIG. 11B.

The FV1 is to the right from the FV2 and the present relative lateral speed does not reach the target relative lateral speed, so the steering to the right is desired. Accordingly, the steering information displaying apparatus 100 may display the screen for guidance of the steering control to the right as in FIG. 11C.

FIGS. 12A and 12B are views illustrating the procedure of converting lane information measured by the preceding vehicle in the viewpoint of the following vehicle, according to a second form of the present disclosure, and FIGS. 13A and 13B are views illustrating that the steering information of the preceding vehicle is displayed based on the lane information measured by the preceding vehicle, according to the second form of the present disclosure.

Referring to FIG. 12A, lane information 1211 is displayed in the viewpoint of the preceding vehicle 11, and FIG. 12B illustrates that lane information 1212 obtained through the conversion into the viewpoint of the following vehicle 12 is displayed.

In this case, the steering information displaying apparatus 100 mounted in a following vehicle 12 receives lane information, which is measured by a preceding vehicle 11, from the preceding vehicle 11 and measures a heading angle of the preceding vehicle 11 and a heading angle of the following vehicle 12.

Accordingly, the steering information displaying apparatus 100 mounted in the following vehicle 12 converts the lane information of the preceding vehicle into lane information viewed in the viewpoint of the following vehicle by rotating the lane information, which is measured by the preceding vehicle, by the difference between the heading angle of the preceding vehicle and the heading angle of the following vehicle, and by moving the lane information, which is measured by the preceding vehicle, by the distance in a longitudinal/lateral direction between the origin point of the preceding vehicle and the origin point of the following vehicle.

FIG. 13A illustrates the calculation of a lane departure predicted time point and a lane departure position, and FIG. 13B illustrates that a lane departure warning is displayed.

The steering information displaying apparatus 100 of the following vehicle may calculate a lane departure predicted time point, based on the viewpoint-converted lane information, which is measured by the preceding vehicle, of the following vehicle, the predicted driving route of the host vehicle, and the speed of the host vehicle, may compare the calculated lane departure predicted time point with a preset threshold value, and may display the lane departure warning when the calculated lane departure predicted time point is equal to or less than the preset threshold value. In this case, the steering information displaying apparatus 100 may determine, as the lane departure time point, a point, which has the longest longitudinal distance of 'y' from the host vehicle, among coordinates of lanes smaller than 'R' in the distance to the central point (−R, 0) of the route of the host vehicle, and the time point (time to cross) that lane departure is predicted may be calculated using the speed of the host vehicle and the distance to the point that the lane is departed.

Therefore, as illustrated in FIG. 13B, the steering information displaying apparatus 100 of the following vehicle 12 may display viewpoint-converted lane information 1312, which is measured by the preceding vehicle, of the following vehicle, lane information 1314 measured by the following vehicle, a position, which is measured by the following vehicle, of the preceding vehicle 11, a position for a lane departure warning 1311, and lane information 1313 in the lane departure. In this case, the lane departure position may be displayed in a specific shape (e.g., a bomb shape or a star shape) and the lane departure position and the lane information 1313 after the lane departure position may be displayed in colors different coordinate colors of the measured lane information 1314 and the viewpoint-converted lane information 1312.

FIG. 14 is a view illustrating that precise map based steering information of the preceding vehicle, according to a third form of the present disclosure.

Referring to FIG. 14, the steering information displaying apparatus 100 of the following vehicle 12 extracts lane information 1411 based on a precise map provided in the following vehicle 12, displays the position, which is measured by the following vehicle 12, of the preceding vehicle 11 on the lane information 1411, and calculates the lane departure predicted time point by using the predicted driving route and speed of the host vehicle. Accordingly, the steering information displaying apparatus 100 may compare the calculated departure predicted time point with the threshold value, which is preset, and may display a warning of the lane departure position 1412 when the calculated lane departure predicted time point is equal to or less than the threshold value.

FIGS. 15A, 15B, 15C and 15D are views illustrating that the steering information of the preceding vehicle is displayed based on steering angle information received from the preceding vehicle, according to a fourth form of the present disclosure.

Referring to FIGS. 15A, 15B, 15C and 15D, the steering information displaying apparatus 100 of the following vehicle 12 may receive the steering angle information and the lane departure warning information of the preceding vehicle 11 and the lane information, which is measured by the preceding vehicle 11, from the preceding vehicle 11 through V2V communication.

Figure 15A:
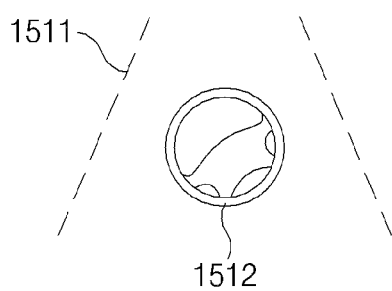

Referring to FIG. 15A, the steering information displaying apparatus 100 of the following vehicle 12 may display the steering angle information of the preceding vehicle together with lane information 1511 measured by the following vehicle 12. In this case, the steering angle information of the preceding vehicle may be displayed in a steering wheel form 1512, and may be displayed by changing the direction of the steering wheel form 1512 based on the direction of the steering angle.

Figure 15B:
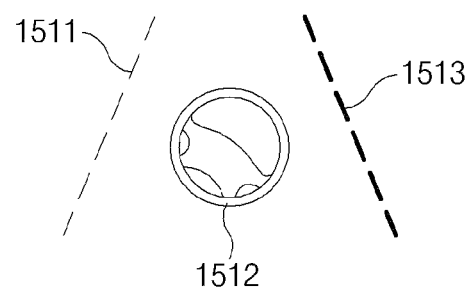

Referring to FIG. 15B, the steering information displaying apparatus 100 of the following vehicle 12 may display a lane departure warning 1513 by differently displaying the color, the thickness, or the shape of a lane, which is predicted to be departed, of the lane information 1511 measured by the following vehicle 12.

Figure 15C:
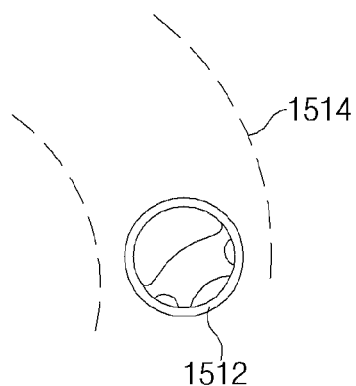

Referring to FIG. 15C, the steering information displaying apparatus 100 of the following vehicle 12 may display even the curvature of the front lane covered by the preceding vehicle using the lane information 1514 measured by the preceding vehicle 11.

Figure 15D:
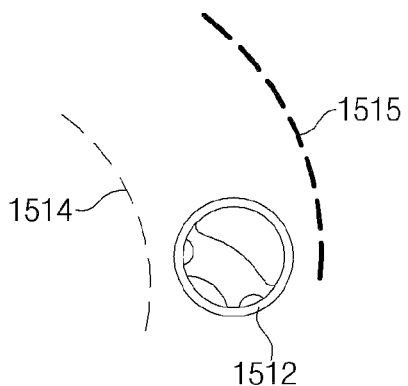

In addition, referring to FIG. 15D, the steering information displaying apparatus 100 of the following vehicle 12 may display the lane departure warning 1515 by differently displaying the color, the thickness, or the shape of a lane which is predicted to be departed.

Hereinafter, a method for displaying steering information of the preceding vehicle according to one form of the present disclosure will be described in detail with reference to FIG. 16. FIG. 16 is a flowchart illustrating the method for displaying the steering information of the preceding vehicle, according to one form of the present disclosure.

Hereinafter, the steering information displaying apparatus 100 of FIG. 1 performs a process of FIG. 16. Especially, it is assumed that the steering information displaying apparatus 100 mounted in the following vehicle performs the process. In addition, in the following description made with reference to FIG. 16, it may be understood that the operation described as being performed by the steering information displaying apparatus 100 is controlled by the processor 140 of the steering information displaying apparatus 100.

Referring to FIG. 16, the steering information displaying apparatus 100 may determine whether a preceding vehicle is present during platooning (S101), and may display a bar graph in a default state that a target relative lateral speed is zero, when the preceding vehicle is absent (S108).

Meanwhile, the steering information displaying apparatus 100 calculates the target relative lateral speed using the target time of alignment and the present relative lateral distance when the preceding vehicle is present (S102). In this case, the target time of alignment may be determined depending on the present speed, the yaw rate, the lateral relative distance, or the lane departure predicted time, and the present relative lateral distance may be obtained from a sensing result value of a sensing device 200.

The steering information displaying apparatus 100 determines the degree of a dangerous situation based on the target relative lateral speed, the present relative lateral speed, the yaw rate of the host vehicle, the present relative lateral distance, or the lane departure time. In this case, the following description will be made by sub-dividing the dangerous situation into a first level (caution) and a second level (severe), and the present disclosure is not limited thereto. For example, the dangerous situation may be sub-divided into three levels and defined. In this case, the first reference value and the second reference value, which is greater than the first reference value, for determining the dangerous situation may be previously calculated based on experimental values.

The steering information displaying apparatus 100 may determine whether the dangerous situation is severe in the second level (S103). When the dangerous situation is determined as being server in the second level, the steering information displaying apparatus 100 may display the target relative lateral speed and the present relative lateral speed on the bar graph and may display the present relative lateral speed region in the first color (red) (S104). In this case, the steering information displaying apparatus 100 may determine the dangerous situation as being in the second level when the target relative lateral speed, the present relative lateral speed, the yaw rate of the host vehicle, the present relative lateral distance, the lane departure time, or the difference between the target relative lateral speed and the present relative lateral speed exceeds the second reference values, respectively.

Meanwhile, when the dangerous situation is not in the second level, the steering information displaying apparatus 100 determines whether the dangerous situation is in the first level (caution) (S105). When the dangerous situation is in the first step, the steering information displaying apparatus 100 may display the target relative lateral speed and the present relative lateral speed on the bar graph, and may display the present relative lateral speed region in the second color (yellow) (S106). In this case, the steering information displaying apparatus 100 may determine the dangerous situation as being in the first level when the target relative lateral speed, the present relative lateral speed, the yaw rate of the host vehicle, the present relative lateral distance, the lane departure time, or the difference between the target relative lateral speed and the present relative lateral speed exceeds the first reference values, which are preset, respectively.

In addition, when the dangerous situation is not in the first level, the steering information displaying apparatus 100 may display the target relative lateral speed and the present relative lateral speed on the bar graph and may display the present relative lateral speed region in the third color (green) (S107).

As described above, according to the present disclosure, in platooning, when calculating the target relative lateral speed using the present relative lateral distance and the target time of alignment with respect to the preceding vehicle, and displaying and using the target relative lateral speed and the present relative lateral speed together, the steering information displaying apparatus 100 may help the driver of the following vehicle to easily perform safe steering control and intuitively recognize the dangerous situation, even if the visual field is limited due to the preceding vehicle travelling with a narrow inter-vehicle distance, thereby improving the safety in platooning.

FIG. 17 illustrates a computing system, according to one form of the present disclosure.

Referring to FIG. 17, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the terminal of the user.

As described above, according to the present disclosure, the steering information of the preceding vehicle is provided to the driver of the following vehicle in platooning, so the problem that the preceding vehicle obstructs the visual field of the driver of the following vehicle may be resolved.

In addition, according to the present disclosure, displaying, the target relative lateral speed and the present relative lateral speed calculated based on the present relative lateral distance to the preceding vehicle are displayed to the driver of the following vehicle to control platooning to be safe.

Further, according to the present disclosure, the information on the lane, which is covered by the preceding vehicle, is generated based on the lane information measured by the preceding vehicle, and the generated information of the lane is displayed to the driver of the following vehicle In addition, according to the present disclosure, the lane information is obtained from the precise map and displayed to the driver of the following vehicle, thereby controlling the platooning to be safe.

Further, according to the present disclosure, the information on the steering angle and the lane departure warning of the preceding vehicle, which is received from the preceding vehicle, is displayed to the driver of the following vehicle, thereby controlling the platooning to be safe.

Besides, a variety of effects directly or indirectly understood through the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the foams. The scope of the present disclosure should be construed on the basis of the accompanying claims, and all the technical ideas within the scope equivalent to the claims should be included in the scope of the present disclosure.

What is claimed is:

1. An apparatus for displaying steering information of a vehicle, the apparatus comprising:
   a processor of a host vehicle, where the processor is configured to receive steering information of a preceding vehicle among a plurality of platooning vehicles including the host vehicle; and
   a display controlled by the processor and configured to display the received steering information of the preceding vehicle,
   wherein the processor is further configured to:
      calculate a target relative lateral speed of the host vehicle with respect to the preceding vehicle based on a present relative lateral distance to the preceding vehicle from the host vehicle; and
      display, on the display, the target relative lateral speed and a present relative lateral speed of the host vehicle relative to the preceding vehicle; and
   determine a dangerous situation resulting from a steering control; and
   display the determined dangerous situation on the display.

2. The apparatus of claim 1, wherein the processor is configured to:
   determine a degree of the determined dangerous situation based on at least one of the target relative lateral speed, a yaw rate of the host vehicle, the present relative lateral speed, the present relative lateral distance, or a lane departure time of the host vehicle.

3. The apparatus of claim 1, wherein the processor is configured to:
   display, on the display, a bar graph with a reference point defining a right side representing a plus direction and a left side representing a minus direction, and
   display the target relative lateral speed and the present relative lateral speed on the bar graph.

4. The apparatus of claim 3, wherein the processor is configured to:
mark, on the bar graph, the target relative lateral speed with a triangular mark and a solid line, and the present relative lateral speed with a bar.

5. The apparatus of claim 3, wherein the processor is configured to:
display, on the bar graph, a target relative lateral speed region.

6. The apparatus of claim 5, wherein the processor is configured to:
determine a size of the target relative lateral speed region based on a difference between the target relative lateral speed and the present relative lateral speed.

7. The apparatus of claim 3, wherein the processor is configured to:
mark, on the bar graph, a plurality of regions with different colors representing different levels of the determined dangerous situation.

8. The apparatus of claim 1, wherein the processor is configured to:
display, on the display, the present relative lateral distance of the preceding vehicle.

9. The apparatus of claim 8, wherein the processor is configured to:
display, on the display, a vehicle icon based on the present relative lateral distance of the preceding vehicle on a bar graph, or display the present relative lateral distance in numerical value.

10. The apparatus of claim 1, wherein the processor is configured to:
display, on the display, information desired for a steering control of the host vehicle based on the target relative lateral speed, the present relative lateral speed, and the determined dangerous situation.

11. The apparatus of claim 1, wherein the processor is configured to:
calculate the target relative lateral speed using a target time of alignment determined based on the present relative lateral distance and a driving situation.

12. The apparatus of claim 1, wherein the processor is configured to:
when the target relative lateral speed is equal to the present relative lateral speed, and the present relative lateral distance of the preceding vehicle is equal to or less than a preset reference value, determine a present level as a first level having a lower dangerousness and display a bar graph in a first color.

13. The apparatus of claim 12, wherein the processor is configured to:
determine the present level as a second level having dangerousness higher than the dangerousness of the first level and display the bar graph in second color different from the first color, when a difference between the target relative lateral speed and the present relative lateral speed is greater than a first reference value and equal to or less than a second reference value and when the target relative lateral speed and the present relative lateral speed are positioned in opposition to each other based on a reference point of a bar graph.

14. The apparatus of claim 13, wherein the processor is configured to:
determine the present level as a third level having dangerousness higher than the dangerousness of the second level and display the bar graph in third color different from the first and second colors, when the difference between the target relative lateral speed and the present relative lateral speed is greater than the second reference value.

15. The apparatus of claim 13, wherein the processor is configured to:
determine the present level as a third level having dangerousness higher than the dangerousness of the second level and display the bar graph in third color different from the first and second colors, when the difference between the target relative lateral speed and the present relative lateral speed is greater than the second reference value.

16. The apparatus of claim 1, wherein the processor is configured to:
display, on the display, information on a lane covered by the preceding vehicle using lane information measured by the preceding vehicle.

17. The apparatus of claim 16, wherein the processor is configured to:
provide a lane departure warning by converting the lane information, which is measured by the preceding vehicle into lane information viewed in a viewpoint of a host vehicle, and calculating a lane departure predicted time point using the converted lane information, which is viewed in the viewpoint of the host vehicle, a predicted driving route of the host vehicle, a speed of the host vehicle.

18. The apparatus of claim 17, wherein the processor is configured to:
display, on the display, at least one of the converted lane information which is viewed in the viewpoint of the host vehicle, the lane information measured by the host vehicle, a position, which is measured by the host vehicle, of the preceding vehicle, or the lane departure warning.

19. The apparatus of claim 1, wherein the processor is configured to:
display, on the display, precise map based lane information and a position of the preceding vehicle on the precise map based lane information; and
provide a lane departure warning by calculating a lane departure predicted time point using a predicted driving route of a host vehicle and a speed of the host vehicle.

20. The apparatus of claim 1, wherein the processor is configured to:
display, on the display, steering angle information and lane departure information of the preceding vehicle, which are received from the preceding vehicle.

21. The apparatus of claim 20, wherein the processor is configured to:
display, on the display, information on a curvature of a front lane covered by the preceding vehicle using lane information, which is measured by the preceding vehicle, received from the preceding vehicle.

22. A method for displaying steering information of a vehicle, the method comprising:
receiving, by a processor of a host vehicle, steering information of a preceding vehicle among a plurality of platooning vehicles including the host vehicle; and
displaying, by the processor, the steering information of the preceding vehicle on a display of the host vehicle,
wherein displaying the steering information of the preceding vehicle includes:
calculating a target relative lateral speed using a present relative lateral distance to the preceding vehicle from the host vehicle;

displaying, on the display, the target relative lateral speed and a present relative lateral speed of the host vehicle relative to the preceding vehicle;

determining a dangerous situation resulting from a steering control; and displaying the determined dangerous situation on the display.

23. The method of claim 22, wherein displaying the steering information of the preceding vehicle includes:

displaying information on a lane covered by the preceding vehicle using lane information measured by the preceding vehicle.

24. The method of claim 22, wherein displaying the steering information of the preceding vehicle includes:

providing a lane departure warning by converting lane information, which is measured by the preceding vehicle into lane information viewed in a viewpoint of the host vehicle; and calculating a lane departure predicted time point using the converted lane information, which is viewed in the viewpoint of the host vehicle, a predicted driving route of the host vehicle, a speed of the host vehicle.

25. The method of claim 24, wherein displaying the steering information of the preceding vehicle includes:

displaying at least one of the converted lane information which is viewed in the viewpoint of the host vehicle, the lane information measured by the host vehicle, a position, which is measured by the host vehicle, of the preceding vehicle, or the lane departure warning.

26. The method of claim 22, wherein displaying the steering information of the preceding vehicle includes:

displaying precise map based lane information and a position of the preceding vehicle on the lane information, and provide a lane departure warning by calculating a lane departure predicted time point using a predicted driving route of a host vehicle and a speed of the host vehicle.

27. The method of claim 22, wherein displaying the steering information of the preceding vehicle includes:

displaying a curvature of a front lane covered by the preceding vehicle by using steering angle information and lane departure warning information of the preceding vehicle, and lane information measured by the preceding vehicle, which are received from the preceding vehicle.

* * * * *